Jan. 16, 1968    F. S. MACOMBER    3,363,787
HAND TRUCK
Filed June 15, 1965    5 Sheets-Sheet 1

Inventor
Franklin S. Macomber
By Brown, Jackson,
Boettcher & Dienner
att'ys.

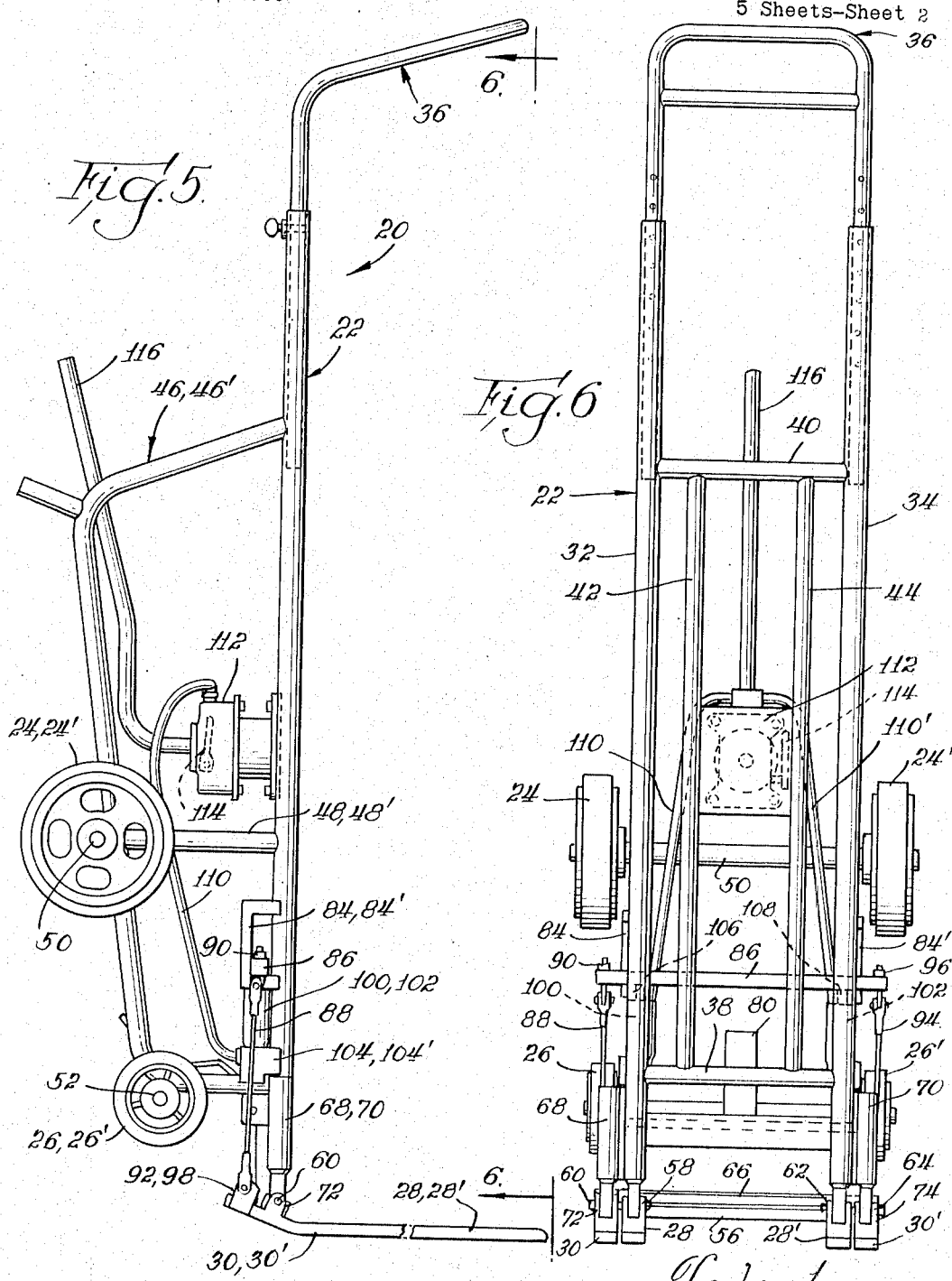

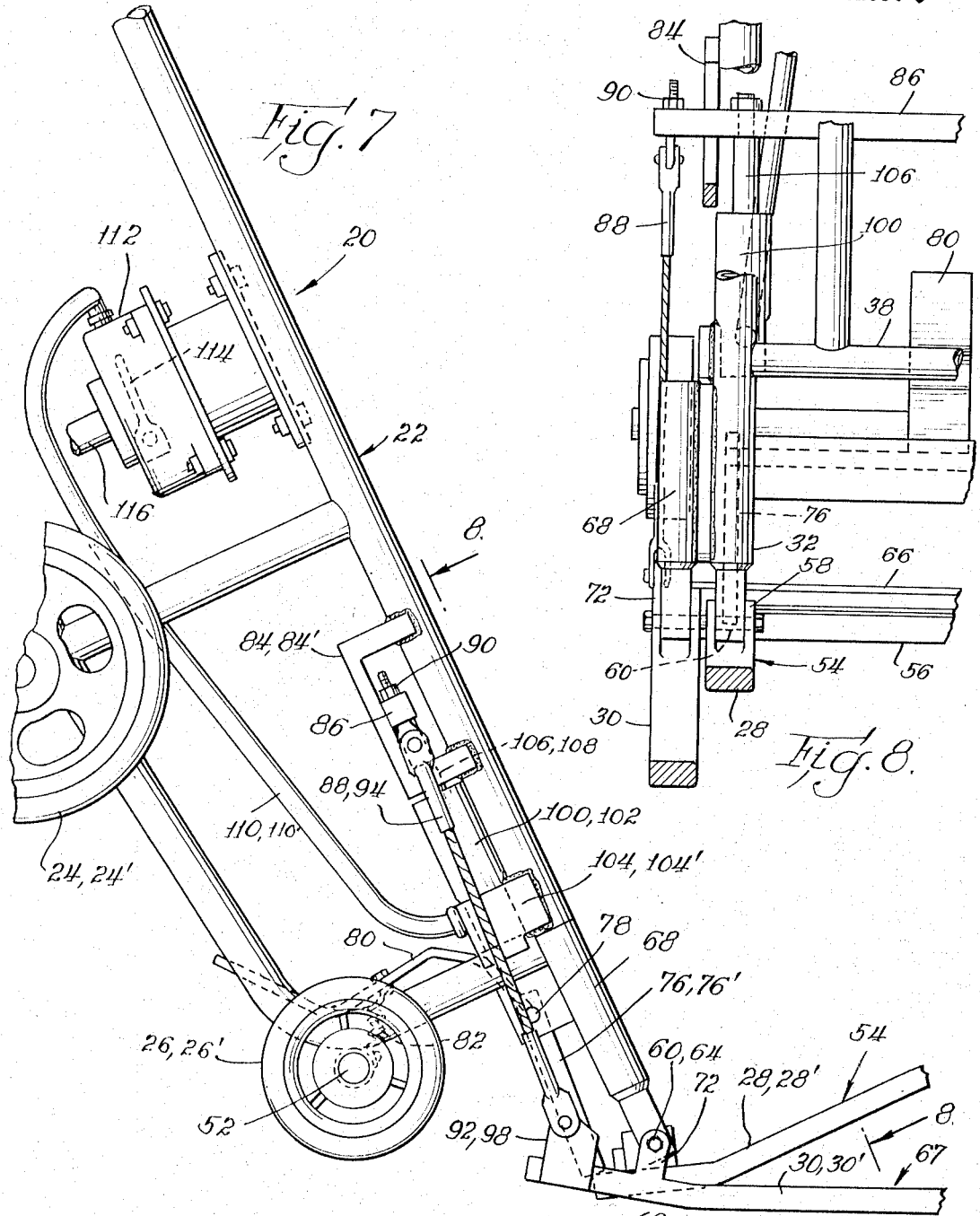

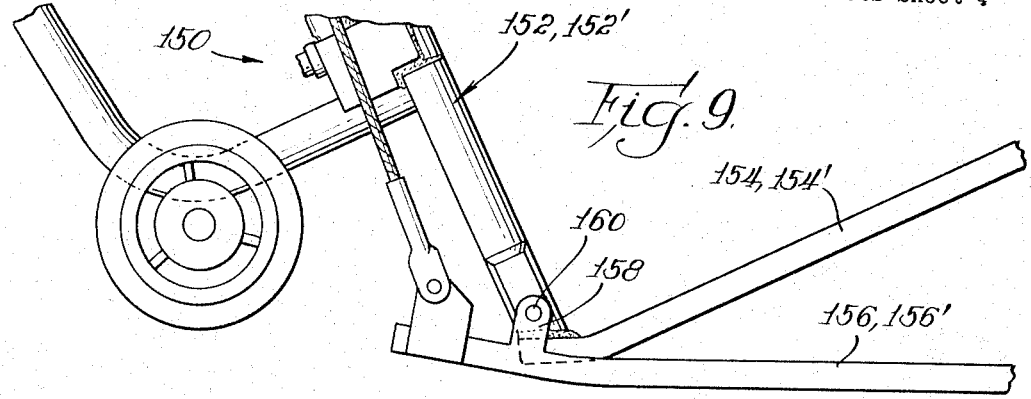
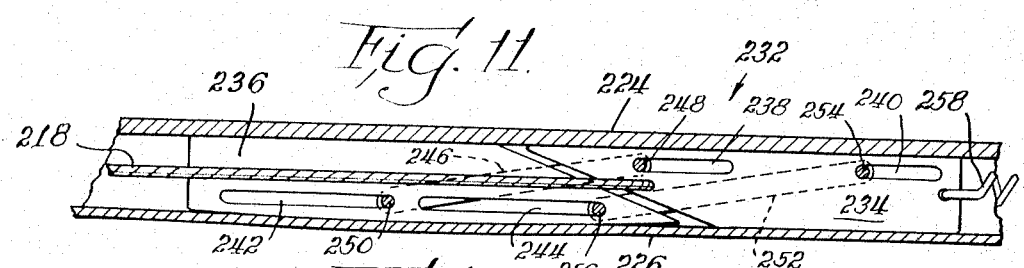
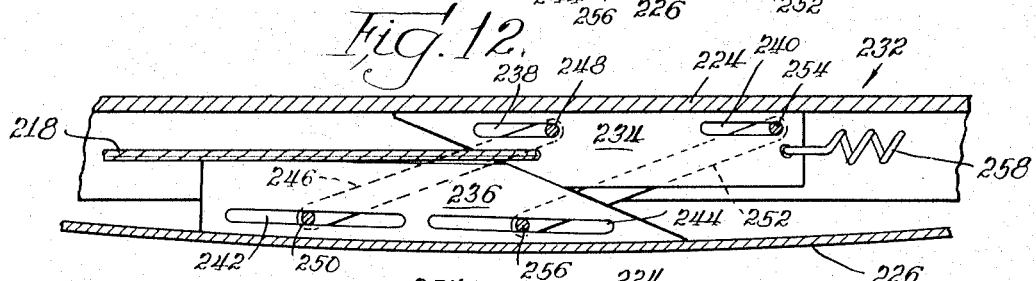
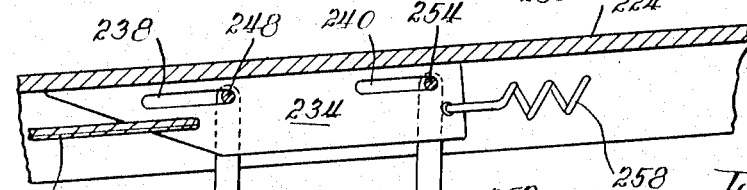
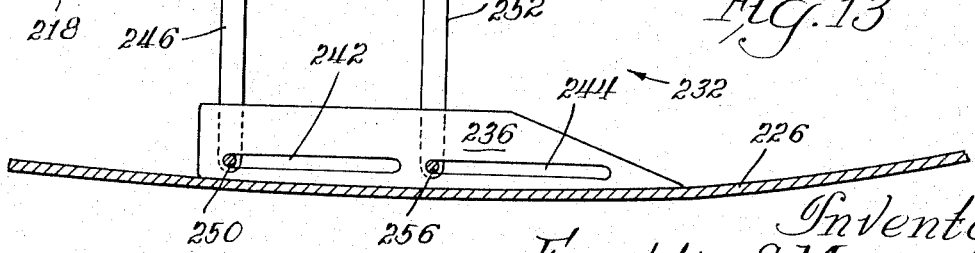

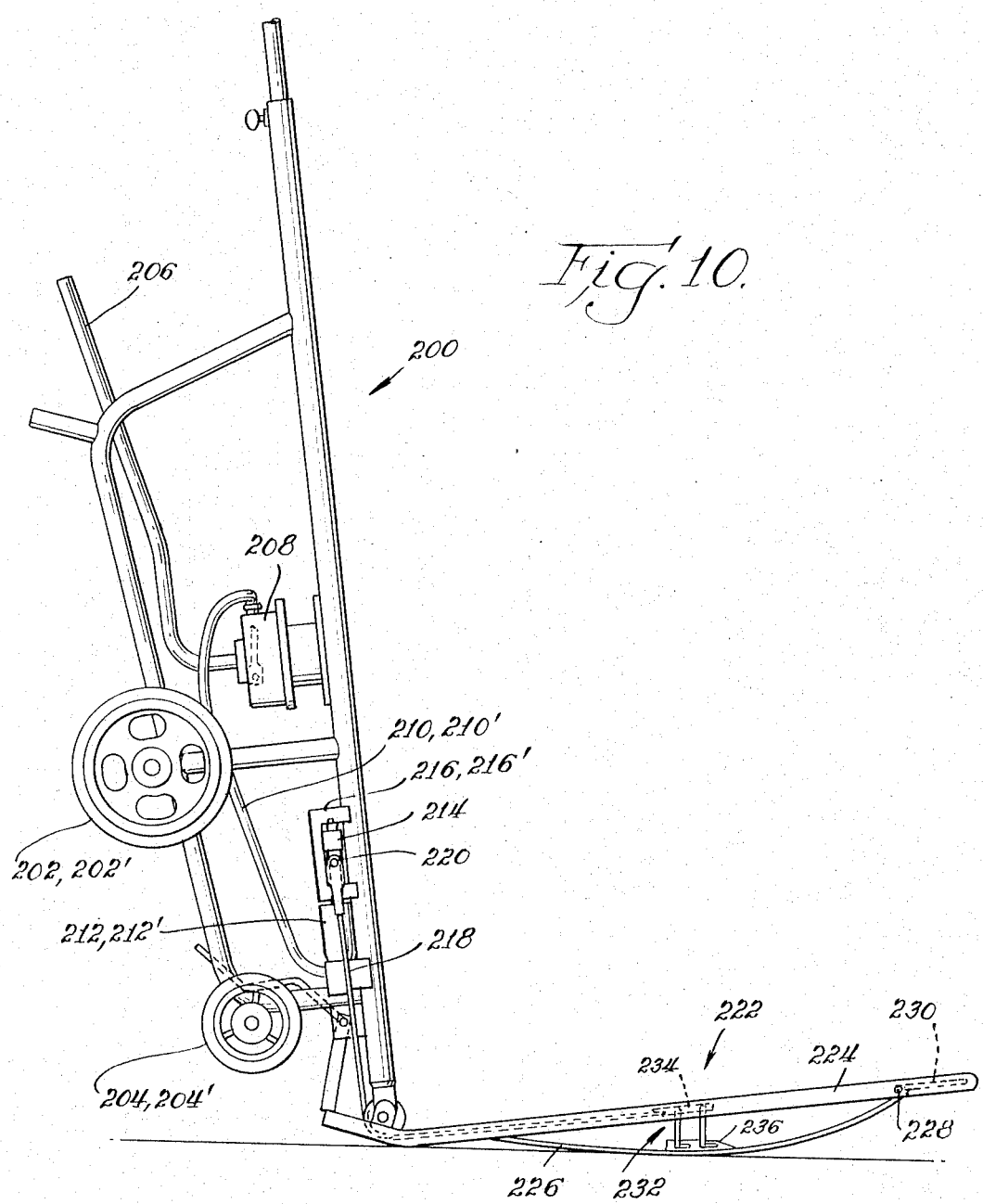

United States Patent Office 3,363,787
Patented Jan. 16, 1968

3,363,787
HAND TRUCK
Franklin S. Macomber, Park Ridge, Ill., assignor to A. T. Kearney Personnel Services, Chicago, Ill., a co-partnership
Filed June 15, 1965, Ser. No. 464,046
4 Claims. (Cl. 214—370)

ABSTRACT OF THE DISCLOSURE

A hand truck including improved power assist means for pivoting the truck back from a first position, where the wheels are raised above the supporting floor surface and the load carrying means is supported in a horizontal position on the floor surface, toward a second position wherein the wheels are supported on the floor surface and the load carrying means is raised above the floor surface.

The present invention relates to an improved hand truck of the type which is moved beneath a heavy load and then tilted back to lift the load and dispose the truck wheels on the floor whereby with the load supported on the truck wheels the truck may be rolled along the floor to transport the load. More specifically, the present invention relates to a mechanism mounted on the truck for providing a power assist in tilting or rocking the truck back from a loading position to a rolling position when a heavy load is disposed thereon.

The object of the present invention is to provide an improved hand truck having a mechanism which is operated when the truck is in a loading position with a full load thereon to tilt or rock the loaded truck back toward a rolling position wherein the load is supported on the truck wheels.

Another object of the invention is to provide an improved hand truck as last above-mentioned wherein the mechanism which provides a power assist in rocking a loaded truck back on its wheels will also assist the operator in gradually tilting the truck from a rolling position back to a loading or unloading position when it is desired to remove the load from the truck.

The foregoing and other objects and advantages of the invention will be apparent from the following description thereof.

Now in order to acquaint those skilled in the art with the manner of constructing and utilizing my invention, I shall describe in conjunction with the accompanying drawings certain preferred embodiments of the invention.

In the drawings:

FIGURE 1 is a side elevational view showing a hand truck constructed in accordance with the present invention, the truck being shown after load-carrying forks thereof have been positioned beneath a load disposed on a pallet or the like;

FIGURE 5 is an enlarged side elevational view corresponding to FIGURE 2 wherein the load-carrying forks are disposed on the floor and the main body of the truck which is locked relative to such forks is disposed in an upright position;

FIGURE 6 is a front elevational view looking approximately in the direction of the arrows 6—6 of FIGURE 5;

FIGURE 7 is a substantially enlarged fragmentary side elevational view corresponding to FIGURE 3 as when a loaded truck is being tilted from the position of FIGURE 5 toward a rolling position by the power assist mechanism of the present invention;

FIGURE 8 is a fragmentary elevational view, partly in section, taken approximately along the line 8—8 of FIGURE 7;

FIGURE 9 is a fragmentary elevational view illustrating an alternative embodiment of the present invention wherein the main load-carrying forks are permanently fixed relative to the main body of the truck;

FIGURE 10 is a side elevational view illustrating still another alternative embodiment of the present invention wherein a fork or blade thickening mechanism is provided for assisting in the tilting of a loaded hand truck back on its wheels to a rolling position, such mechanism including means for temporarily creating a rounded surface at the underside of the blades; and FIGURES 11, 12 and 13 are substantially enlarged fragmentary views, partly in elevation and partly in section, illustrating the blade thickening mechanism which is embodied in the hand truck of FIGURE 10.

Figure 1:
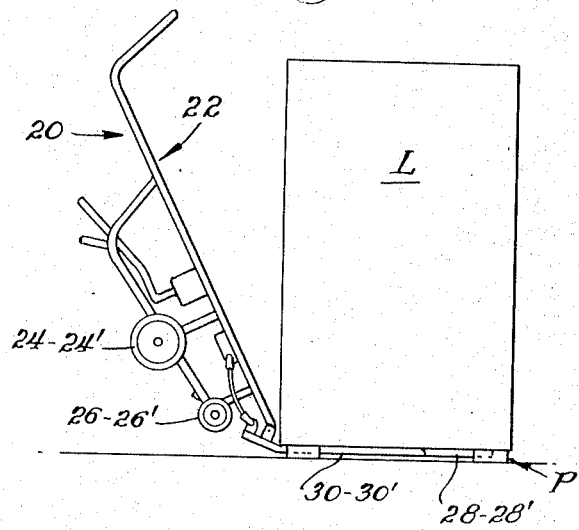

Referring now to the drawings, FIGURE 1 shows a hand truck 20 having a main body or frame 22, a pair of main wheels 24 and 24', a pair of auxiliary wheels 26 and 26', a pair of main load-carrying forks 28 and 28', and a pair of auxiliary forks 30 and 30' which are disposed on opposite sides of the load-carrying forks and are of reduced length relative to the latter. The truck is illustrated in conjunction with a large load L, and in operation the truck is rolled up to the load and located with the two pairs of forks 28 and 28' and 30 and 30' disposed beneath the load which is mounted on a pallet P. The truck body 22 is then tilted upwardly through the position of FIGURE 1 to the position of FIGURE 2, and the truck body is latched in the latter position relative to the main forks 28 and 28'. Thereafter, the short auxiliary forks 30 and 30' are urged downwardly, relative to the interlocked truck body 22 and the main forks 28 and 28', causing the latter to tilt rearwardly as shown in FIGURE 3, after which it becomes a simple matter to manually tilt the truck down to the rolling position of FIGURE 4. Once the truck 20 is in the position of FIGURE 4, it may be wheeled to its destination and unloaded. The truck 20, the pairs of wheels 24 and 24' and 26 and 26' and the load-carrying forks 28 and 28' are all known in the art and are described in Manahan Patent 2,922,-658. The present invention relates to the auxiliary forks 30 and 30' and the mechanism to be described hereinafter for actuating the same in order to tilt the loaded truck 20 back from the position of FIGURE 2 to the approximate position of FIGURE 3.

Referring now to FIGURES 5–8, the main truck body or frame 22 comprises a pair of tubular frame members 32 and 34 which are interconnected at their upper end by a top assembly 36 and adjacent their lower ends by a cross brace 38. An intermediate cross brace 40 is also provided, and a pair of longitudinal braces 42 and 44 extend between the cross braces 38 and 40 and are connected thereto. A pair of curved wheel support braces 46 and 46' are each welded or otherwise connected at their two ends to the main frame members 32 and 34 respectively, and additional braces such as shown at 48 and 48' interconnect the wheel support braces with the main frame members. A main axle 50 is mounted from the wheel support braces 46 and 46' intermediate the upper and lower ends thereof as viewed in FIGURE 5, and the main truck wheels 24 and 24' are rotatably mounted at opposite ends of the axle 50 laterally outwardly of the main frame members 32 and 34. In addition, an auxiliary axle 52 is supported from the wheels support braces 46 and 46' near the lower ends thereof, and the pair of auxiliary wheels 26 and 26' are carried on opposite ends of the axle 52, the latter wheels being smaller in diameter than the main wheels 24 and 24' and being disposed substantially closer to the rear ends of the fork members.

A main fork assembly 54 comprises the pair of main load-carrying forks 28 and 28' which are interconnected by a cross brace 56, and in the particular embodiment being described the assembly 54 is pivotally mounted at the lower ends of the frame members 32 and 34. One of the forks 28 is provided with a pair of lugs 58 which straddle the lower end of the frame member 32 and are pivotally connected thereto by means of a pivot pin 60, and the other fork 28' is provided with a pair of lugs 62 which straddle the lower end of the frame member 34 and are pivotally connected thereto by means of a pivot pin 64. Accordingly, the main fork assembly 54 including the two forks 28 and 28' is pivotally movable as a unit relative to the truck frame 22.

The second pair of auxiliary forks 30 and 30' are interconnected by a cross brace 66 so as to provide an auxiliary fork assembly 67 which is also pivotally mounted at the lower end of the frame 22. Thus, a pair of auxiliary fork support members 68 and 70 are fixedly secured to the lower ends of the main frame members 32 and 34 respectively so as to be positioned immediately outwardly thereof. The auxiliary fork 30 is provided with a pair of lugs 72 which straddle the lower end of the member 68, and the pivot pin 60 passes therethrough to provide a pivotal connection between the fork 30 and the lower end of the fork support member 68. Similarly, the auxiliary fork 30' is provided with a pair of lugs 74 which straddle the lower end of the member 70, and the pivot pin 64 passes therethrough to provide a pivotal connection between the fork 30' and the lower end of the fork support member 70.

It will be understood from the foregoing that the main load-carrying fork assembly 54 comprising the fork members 28 and 28' is pivotally connected at the lower ends of the frame members 32 and 34, while the auxiliary fork assembly 67 comprising the auxiliary fork members 30 and 30' is pivotally connected at the lower ends of the auxiliary fork support members 68 and 70. The auxiliary fork members 30 and 30' are disposed outwardly of the pair of load-carrying forks on opposite sides thereof, and the auxiliary forks are pivotally movable together independently of the main forks 28 and 28'. The main fork assembly comprising the fork members 28 and 28' may be locked in the relative position of FIGURES 3 and 7 wherein the main truck frame 22 defines an angle of approximately 90 degrees relative to the plane of the fork 28 and 28'. FIGURE 7 shows a pair of locking plates 76 and 76' which are pivotally connected to the main truck frame as at 78 and which have a common foot release lever 80 which is pivotally movable with the locking plates. When the locking plate 76 is in its operative position as shown in FIGURE 7, the lower end thereof abuts against the rear end of the fork 28 so as to prevent the fork from pivoting in a clockwise direction relative to the main truck frame 22, while the plate 76' similarly locks the fork 28'. Accordingly, with the locking plates 76 and 76' in their operative positions, if the main frame 22 is pivoted from the position of FIGURE 2 to the position of FIGURE 3 and finally to the position of FIGURE 4, the position of the load-carrying forks 28 and 28' relative to the main frame 22 will remain the same. FIGURE 7 shows a tension spring 82 which biases the locking plates 76 and 76' to their operative locking positions, and it will be understood that when the operator depresses the release lever 80 the plates 76 and 76' will be moved in a counterclockwise direction to inoperative positions.

The power mechanism for actuating the auxiliary forks 30 and 30' will now be described with reference to FIGURES 5-8. A pair of guide brackets 84 and 84' are fixedly secured to the backs of the main frame members 32 and 34 respectively, and a cross bar 86 has one end disposed in the guide 84 and its other end disposed in the guide 84'. The cross bar 86 is of such a length that its ends pass through the respective guide members 84 and 84' and extend laterally beyond the main frame members 32 and 34. A first tension rod 88 has one end anchored to the cross bar 86 by a nut 90, and its other end is anchored to a lug 92 provided at the extreme rear end of the fork member 30. A second tension rod 94 has one end anchored to the cross bar 86 by a nut 96, and it other end is anchored to a lug 98 provided at the extreme rear end of the fork member 30'. The cross bar 86 is vertically movable within the guide brackets 84 and 84' and it will be understood that when the cross bar is moved from its lowermost position of FIGURE 5 to the raised position of FIGURE 7, the tension rods 88 and 94 produce clockwise pivoting movement of the auxiliary fork members 30 and 30' relative to the main truck frame 22 from the position of FIGURE 5 wherein the auxiliary forks 30 and 30' are coplanar with the main forks 28 and 28' to the position of FIGURE 7 wherein the auxiliary forks are pivotally displaced from the plane of the main forks.

A pair of cylinders 100 and 102 are mounted respectively on cylinder support members 104 and 104' which in turn are rigidly secured to the main frame members 32 and 34 respectively. The cylinders 100 and 102 are disposed beneath the cross bar 86 and have associated therewith corresponding piston rod members 106 and 108 which extend upwardly therefrom and have their upper ends bolted to the cross bar 86. The cylinders may be operated by a fluid which is supplied through corresponding supply lines 110 and 110' which have their lower ends connected at the bottoms of the cylinder 100 and 102 respectively and their other ends connected to a common valve housing 112 having a manually operable valve control handle 114. A manually operable pump handle 116 is also associated with the valve housing 112 in order to provide fluid under pressure which is conducted to the lower ends of the cylinders 100 and 102 causing the piston rods 106 and 108 to move upwardly raising the cross bar 86. The valve handle 114 is moved to one position when the cross bar 86 is being actuated upwardly to pivot the auxiliary forks 30 and 30' to the position of FIGURE 7, and the handle is moved to a second position when it is desired to permit the forks to be returned to the position of FIGURE 5.

In operation, the foot release lever 80 is depressed to disengage the locking plates 76 and 76' and the truck frame 22 is tilted back to a rolling position with the wheels 26 and 26' disposed on the floor and with the main forks 28 and 28' and the auxiliary forks 30 and 30' lying in approximately coplanar relation adjacent to or on the floor. If desired, small rollers or the like may be mounted on the bottoms of the auxiliary forks 30 and 30' to facilitate rolling of the truck when the fork members are supported on the floor. The truck is then moved up to a load L to insert the fork members beneath the pallet P on which the load is mounted. Once the forks are properly disposed beneath a loaded pallet, the frame 22 is pivoted upwardly through the position of FIGURE 1 to the upright position of FIGURE 2 in which it is automatically locked relative to the main forks 28 and 28' by the locking plates 76 and 76'.

The next step is to tilt back the loaded truck by means of the power assist mechanism of the present invention. Accordingly, the valve handle 114 is moved to the proper valve position and the manual pump handle 116 is operated to pump fluid under pressure through the lines 110 and 110' to the cylinders 100 and 102 causing the piston rods 106 and 108 to move upwardly and raise the cross bar 86 from the position of FIGURE 5 to the position of FIGURE 7. The cross bar 86 acts on the tension rods 88 and 94 to pivot the two auxiliary fork members 30 and 30' as a unit in a clockwise direction relative to the main frame 22 from the position of FIGURE 5 where they are coplanar with the main forks 28 and 28' to the position of FIGURE 7 where they are pivotally displaced from the plane of the forks 28 and 28' by a substantial angle. Such movement of the auxiliary forks 30 and 30', relative to the frame 22 and the main forks 28 and 28', forces the loaded hand truck back to the tilted position of FIGURES 3 and 7, after which it may be manually lowered to the rolling position of FIGURE 4 wherein the two pairs of wheels 24 and 24' and 26 and 26' are disposed on the floor. When there is a heavy load on the truck such as a load of 1000 pounds, it is extremely difficult to tilt the truck back from the upright position of FIGURE 2 to the rolling position of FIGURE 4, and the power assist mechanism described herein greatly facilitates such operation. In the embodiment being described each of the cylinders 100 and 102 is capable of developing a thrust of 5000 pounds so as to produce a total thrust of 10,000 pounds at the extreme rear ends of the auxiliary forks 30 and 30', and such forces will produce a total force of approximately 1000 pounds at the forward outer ends of the auxiliary forks to rock back the loaded truck.

Figure 2:
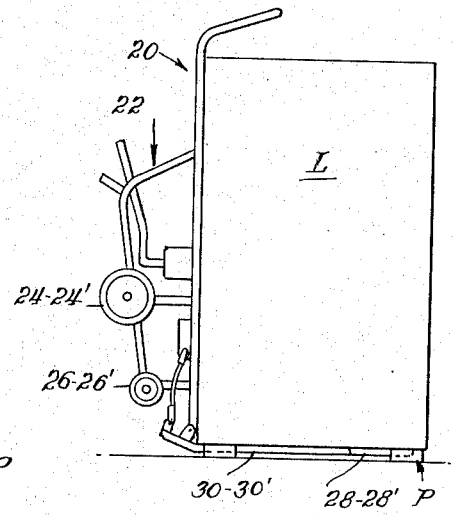
FIGURE 2 is a view similar to FIGURE 1 showing the truck after the main body thereof has been tilted up to an angle of approximately 90 degrees relative to the load-carrying forks and locked in such relative position with the wheels disposed off the floor.
Figure 3:
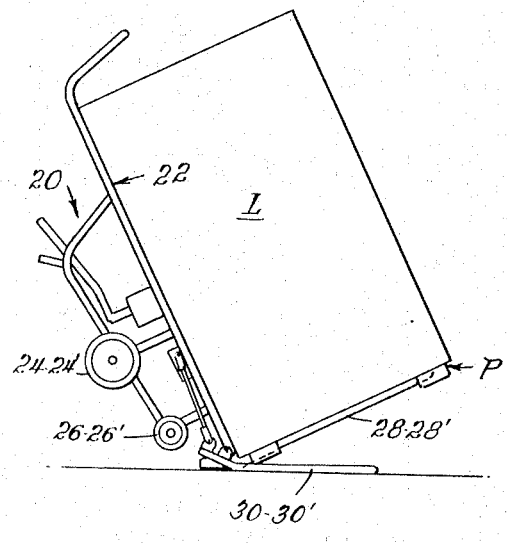
FIGURE 3 is a view similar to FIGURE 1 showing the loaded truck as the latter is being tilted back from the position of FIGURE 2 toward a rolling position with the assistance of power assist mechanism designed in accordance with the present invention.
Figure 4:
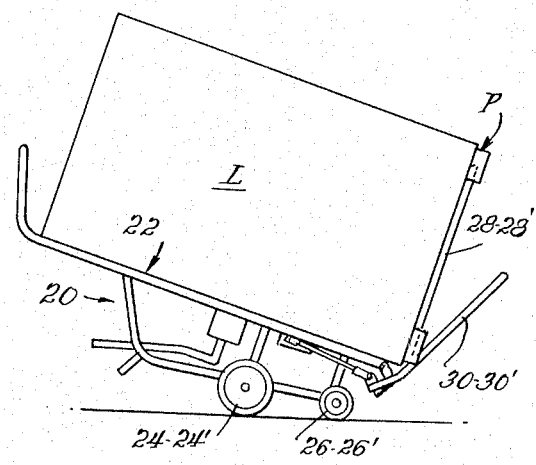
FIGURE 4 is a view similar to FIGURE 1 showing the loaded hand truck tilted back on its wheels to a rolling position.

When a loaded truck has been rocked back to the position of FIGURE 4, it is rolled to its destination and then is tilted back to the position of FIGURE 2 for unloading. Another important advantage of the present invention is that the auxiliary forks 30 and 31' may be utilized to control the tilting of the truck back to the position of FIGURE 2 by moving the valve handle 114 to its alternate position whereby the fluid under pressure will gradually escape from the cylinders 100 and 102. Thus, the truck may be manually tilted from the position of FIGURE 4 to the position of FIGURE 3 to dispose the auxiliary forks 30 and 30' on the floor, and thereafter the valve handle 114 is moved to permit the auxiliary forks to gradually return to a coplanar position relative to the main forks 28 and 28', thereby controlling the gradual tilting of the loaded truck from the position of FIGURE 3 to the position of FIGURE 2.

It should be understood that the present invention is concerned with power operated means disposed adjacent the load-carrying forks 28 and 28' which act against the floor on the one hand and on the forks 28 and 28' or the frame 22 on the other hand to forcibly rock a loaded truck back from the upright position of FIGURE 2. The invention may take other forms than the auxiliary fork members 30 and 30' described hereinabove. Furthermore, it should be understood that the present invention is not limited to a hand truck where the main load-carrying forks 28 and 28' are pivotally movable relative to the main frame 22. The latter arrangement is described in Manahan Patent 2,922,658 and the present invention while particularly well suited for use with such a hand truck is not limited thereto and may be used with other types of hand trucks where the load-carrying forks are fixed relative to the main frame. For example, FIGURE 9 shows an alternative embodiment of the invention comprising a hand truck 150 having main frame members 152 and 152' to which load-carrying forks 154 and 154' are welded or otherwise fixedly attached, while a pair of auxiliary forks 156 and 156' are pivotally mounted such as by means of the lug 158 and the pivot pin 160.

Reference is now made to FIGURE 10 which illustrates still another embodiment of the present invention. There is shown a hand truck 200 which except for the blade mechanism is similar to the hand truck of FIGURE 5 and includes a first pair of wheels 202 and 202' and a second pair of wheels 204 and 204'. A pump handle 206 is manually operable for supplying fluid under pressure from a valve housing 208 through fluid supply lines 210 and 210' to a pair of cylinders 212 and 212' which in turn cause a pair of piston rods to act upon a cross bar 214 to raise the same substantially in the manner previously described in connection with the embodiment of FIGURE 5. The cross bar 214 is guided by the brackets 216, 216' during its movement, and when the cross bar is raised to its uppermost position as shown in FIGURE 10 it pulls with it a tension cable 218 which has one end anchored to the cross bar at 220. The tension cable 218 actuates the blade thickening mechanism to be described hereinbelow.

FIGURE 10 shows a blade assembly 222 comprising a main load supporting upper blade member 224 and a second blade element mounted therebeneath comprising a flexible spring steel strip 226. One end of the flexible steel strip 226 is anchored to the upper main blade 224 while the other end has secured thereto a pin 228 which is movable longitudinally relative to the upper blade in a slot 230 formed in the upper main blade member. Blade thickening mechanism 232 is mounted between the main blade 224 and the spring steel strip 226 in order to force the latter from a flat condition to a curved condition as shown in FIGURE 10 and thereby assist in rocking the truck 200 back toward a rolling position.

Referring now to FIGURES 11–13, FIGURE 11 illustrates the normal position of the blade assembly 222 wherein the lower spring steel member 226 is disposed in a substantially flat condition in close proximity to the upper main blade member 224. In the latter position of the components the overall blade assembly is no more than approximately 0.75 inch thick so that it may be inserted beneath a loaded pallet. When the upper main blade member 224 and the lower flexible spring steel member 226 are moved apart to the position of FIGURE 13, such thickening of the blade assembly tends to rock the hand truck 200 back toward its rolling position as shown in FIGURE 10. It is also important to note that when the main blade member 224 and the flexible spring steel member 226 are forced apart to the relative positions of FIGURE 10, the pin 228 secured to one end of the member 226 will move to the inner end of the slot 230 thereby permitting the member 226 to assume an arched or rounded configuration. When such a rounded surface is created beneath the main blade member 224, it becomes much easier to manually rock the truck 200 back toward its rolling position. The spring steel strip 226 has a tendency to straighten out and when permitted to do so will again assume its substantially flat condition as illustrated in FIGURE 11.

The blade thickening mechanism 232 includes an inclined plate 234 which is secured to the underside of the main blade member 224, and an inclined plate 236 which is secured to the top of the flexible steel member 226. The plate 234 is provided with a pair of generally horizontal slots 238 and 240, and the plate 236 is provided with a pair of generally horizontal slots 242 and 244. A first link member 246 has a pin 248 at one end which rides in the slot 238 and a pin 250 at its opposite end which rides in the slot 242. A second link 252 has a pin 254 at one end which rides in the slot 240 and a pin 256 at its opposite end which rides in the slot 244.

The tension cable 218 is connected at one end of the plate 234 and a tension return spring 258 is connected at the opposite end thereof. The upper and lower blade members 224 and 226 are shown in their normal relative positions in FIGURE 11 wherein they are closely adjacent one another to permit the assembly to be inserted beneath a loaded pallet. Thus, the hand truck 200 may be positioned as shown in FIGURE 2. Thereafter, the pump handle 206 may be operated to pull on the tension cable 218. As the cable 218 is pulled, the inclined surfaces on the plates 234 and 236 will slide on one another causing the upper and lower blade members 224 and 226 to separate vertically as shown in FIGURE 12, and upon further pulling of the cable 218 the link members 246 and 252 will cause the upper member 224 to be raised to its uppermost vertical position as shown in FIGURE 13. It will be understood that as the upper main blade member 224 is raised to the position of FIGURE 13 while the lower member 226 remains supported on the floor, the hand truck 200 will be tilted back from a position such as shown in FIGURE 2 to the position of FIGURE 10. Accordingly, the blade assembly of FIGURES 10-13 constitutes an alternative embodiment of power assist mechanism for performing substantially the same function as the mechanism illustrated in FIGURES 1-8. In addition, the flexing of the lower blade member 226 from the substantially flat condition of FIGURE 11 to the arcuate condition of FIGURES 10 and 13 further facilitates manual rocking of the hand truck 200 back toward its rolling position. If desired, an inflatable rubber bladder (not shown) or the like may be mounted between the upper main blade member 224 and the lower flexible spring steel member 226, and the fluid under pressure from the supply lines 210 and 210' may be supplied to the bladder to inflate the same and thereby force the blade members 224 and 226 apart to the positions of FIGURE 13, in which case the plates 234 and 236 and related linkage mechanism may be eliminated.

While I have illustrated my invention in certain preferred forms, I do not intend to be limited to such forms, except insofar as the appended claims are so limited, since modifications coming within the scope of my invention will be readily suggested to others with my disclosure before them.

I claim:
1. In a hand truck having a main frame, a plurality of wheels mounted on the frame, and load-carrying means connected with the frame at the lower end thereof for supporting a load on the truck, said truck being of the type where the wheels are raised above a supporting floor surface when said load-carrying means is disposed in a horizontal position on said floor surface, the improvement comprising, in combination, tilting plate means pivotally connected to said main frame at the extreme lower end thereof so as to be pivotally movable relative to said frame and said load-carrying means and adapted to lie in a horizontal position on said floor surface, said tilting plate means having an extension which projects rearwardly of the pivotal connection between said tilting plate means and said main frame, a piston-cylinder assembly carried by said main frame, a tension link member having its lower end anchored to said extension on said tilting plate means and having its upper end connected to said piston-cylinder assembly, said piston-cylinder assembly being operable to raise the upper end of said tension link member relative to said main frame so as to produce a downward force on said main frame rearwardly of said pivotal connection thereby pivoting said main frame and said load-carrying means back about the axis of said pivotal connection while said tilting plate means remains supported in a horizontal position on said floor surface, said piston-cylinder assembly having a predetermined limited stroke sufficient to tilt back said load-carrying means to a substantially inclined position while causing the hand truck to remain balanced on said tilting plate means until said hand truck is manually moved to a further tilted position wherein it is supported on said wheels and said tilting plate means is raised above said floor surface.

2. The invention of claim 1 where said tilting plate means comprises a pair of auxiliary fork members each having an extension which projects rearwardly of the pivotal connection between said auxiliary fork members and said main frame, and wherein a pair of tension link members are provided each having its lower end anchored to a corresponding one of said extensions.

3. The invention of claim 1 where said piston-cylinder assembly also serves to control the lowering of the upper end of said tension link member relative to said main frame when it is desired to unload said hand truck, thereby permitting said load-carrying means to pivot forward under control to a horizontal position wherein it is again supported on said floor surface.

4. In a hand truck having a main frame, a plurality of wheels mounted on the frame, and load-carrying means connected with the frame at the lower end thereof for supporting a load on the truck, said truck being of the type where the wheels are raised above a supporting floor surface when said load-carrying means is disposed in a horizontal position on said floor surface, the improvement comprising, in combination, tilting plate means pivotally connected to said main frame at the extreme lower end thereof so as to be pivotally movable relative to said frame and said load-carrying means and adapted to lie in a horizontal position on said floor surface, said tilting plate means comprising a pair of auxiliary fork members each having an extension which projects rearwardly of the pivotal connection between said auxiliary fork members and said main frame, a pair of tension members each having its lower end anchored to a corresponding one of said extensions, crossbar means interconnecting the upper ends of said pair of tension members, said crossbar means being guided for movement upwardly and downwardly relative to said main frame, and a piston-cylinder assembly carried by said main frame and connected with said crossbar means for raising said crossbar means relative to said main frame in order to pivot said main frame and said load-carrying means back about the axis of said pivotal connection while said auxiliary fork members remain supported in a horizontal position on said floor surface, and for lowering said crossbar means under control relative to said main frame in order to permit said load-carrying means to pivot back to a horizontal position wherein it is supported on said floor surface.

References Cited
UNITED STATES PATENTS

| | | | |
|---|---|---|---|
| 1,539,933 | 6/1925 | Britton | 280—47.29 |
| 2,582,102 | 1/1952 | Carter | 214—381 |
| 3,141,564 | 7/1964 | Reich | 214—379 |

GERALD M. FORLENZA, *Primary Examiner.*

ALBERT J. MAKAY, *Examiner.*